United States Patent
Yang et al.

(10) Patent No.: US 12,515,694 B2
(45) Date of Patent: Jan. 6, 2026

(54) METHOD FOR PROCESSING BEHAVIOR DATA, METHOD FOR CONTROLLING AUTONOMOUS VEHICLE, AND AUTONOMOUS VEHICLE

(71) Applicant: Beijing Baidu Netcom Science Technology Co., Ltd., Beijing (CN)

(72) Inventors: Jianzhong Yang, Beijing (CN); Deguo Xia, Beijing (CN); Jizhou Huang, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 231 days.

(21) Appl. No.: 18/151,718

(22) Filed: Jan. 9, 2023

(65) Prior Publication Data
US 2023/0159052 A1  May 25, 2023

(30) Foreign Application Priority Data
May 19, 2022  (CN) .......................... 202210556131.2

(51) Int. Cl.
*B60W 60/00* (2020.01)
*B60W 40/06* (2012.01)

(52) U.S. Cl.
CPC .......... *B60W 60/001* (2020.02); *B60W 40/06* (2013.01); *B60W 2520/00* (2013.01); *B60W 2552/00* (2020.02); *B60W 2556/10* (2020.02)

(58) Field of Classification Search
CPC ............... B60W 60/001; B60W 40/06; B60W 2520/00; B60W 2552/00; B60W 2556/10
See application file for complete search history.

(56) References Cited

U.S. PATENT DOCUMENTS

| 9,139,204 | B1 * | 9/2015 | Zhao | B60W 40/06 |
| 11,550,851 | B1 * | 1/2023 | Kabzan | G06N 20/00 |

(Continued)

FOREIGN PATENT DOCUMENTS

| CN | 105180952 | A | | 12/2015 | |
| CN | 110733507 | A | * | 1/2020 | ............ B60W 40/06 |

(Continued)

OTHER PUBLICATIONS

"Manjoro, W; Dhakar, M; Chauraisa, B; Traffic Congestion Detection using Data Mining in VANET; 2016; 2016 IEEE Students' Conference on Electrical, Electronics and Computer Science" (Year: 2016).*

(Continued)

*Primary Examiner* — Ramya P Burgess
*Assistant Examiner* — Christopher R Cardimino
(74) *Attorney, Agent, or Firm* — Seed Intellectual Property Law Group LLP (57) ABSTRACT

A method for processing behavior data, a method for controlling an autonomous vehicle, apparatuses thereof, a device, a storage medium, a computer program product, and an autonomous vehicle are provided. The method includes: acquiring historical driving data, the historical driving data comprising lane-level navigation data; and performing data mining on the historical driving data to obtain driving feature information, the driving feature information comprising at least one of: a lane-change position feature, a traveling speed feature, or a traveling path feature.

18 Claims, 7 Drawing Sheets

(56) References Cited

U.S. PATENT DOCUMENTS

| | | | | |
|---|---|---|---|---|
| 2009/0299615 | A1* | 12/2009 | Denaro | G01C 21/3658 |
| | | | | 707/999.107 |
| 2012/0095682 | A1* | 4/2012 | Wilson | G01C 21/3841 |
| | | | | 701/532 |
| 2017/0227966 | A1* | 8/2017 | Monzen | B62D 15/0255 |
| 2018/0003515 | A1* | 1/2018 | Saru | G05D 1/0088 |
| 2019/0101649 | A1* | 4/2019 | Jensen | G01S 17/89 |
| 2020/0324775 | A1* | 10/2020 | Schellhorn | G08G 1/0129 |
| 2022/0187085 | A1* | 6/2022 | Luciani | G01C 21/3484 |

FOREIGN PATENT DOCUMENTS

| | | | | |
|---|---|---|---|---|
| CN | 111497870 | A | | 8/2020 |
| CN | 111599183 | A | | 8/2020 |
| CN | 111652153 | A | | 9/2020 |
| CN | 112512887 | A | | 3/2021 |
| CN | 112581763 | A | | 3/2021 |
| CN | 112634607 | A | | 4/2021 |
| CN | 112634655 | A | | 4/2021 |
| CN | 113053135 | A * | 6/2021 | G08G 1/052 |
| CN | 114013452 | A | | 2/2022 |
| CN | 114299712 | A | | 4/2022 |
| CN | 114415628 | A | | 4/2022 |
| CN | 111179601 | B * | 5/2022 | G08G 1/0137 |
| CN | 114428828 | A | | 5/2022 |
| EP | 2159777 | A2 * | 3/2010 | G01C 21/3856 |
| JP | 2022-376 | A | | 1/2022 |
| WO | 2021/146905 | A1 | | 7/2021 |

OTHER PUBLICATIONS

Cui, Shengmin, "Intelligent Networked Vehicle Navigation and Positioning Technology," Jan. 31, 2021, 12 pages.

Xu, "Urban Safety Risk Management Series: Risk Management of Autonomous Driving Road Tests," Tongji University Press, pp. 196-205, Dec. 31, 2021. (11 pages).

Huang, "Basics of Intelligent Vehicle Control," Machinery Industry Press, pp. 142-144, Sep. 30, 2020. (4 pages).

* cited by examiner

METHOD FOR PROCESSING BEHAVIOR DATA, METHOD FOR CONTROLLING AUTONOMOUS VEHICLE, AND AUTONOMOUS VEHICLE

CROSS-REFERENCE TO RELATED APPLICATIONS

The present application claims the priority of Chinese Patent Application No. 202210556131.2, titled "METHOD FOR PROCESSING BEHAVIOR DATA, METHOD FOR CONTROLLING AUTONOMOUS VEHICLE, AND AUTONOMOUS VEHICLE", filed on May 19, 2022, the content of which is incorporated herein by reference in its entirety.

TECHNICAL FIELD

The present disclosure relates to the technical field of artificial intelligence, in particular to the technical fields of autonomous driving, big data and deep learning, and more particularly, to a method for processing behavior data, a method for controlling an autonomous vehicle and apparatuses thereof, a device, a storage medium, a computer program product, and an autonomous vehicle.

BACKGROUND

With the gradual popularization of artificial intelligence technology and the fifth-generation mobile communication technology, autonomous driving technology has developed rapidly, and the use of autonomous driving technology in vehicles is also increasing. Usually, an autonomous driving function is implemented mainly relying on basic technologies such as machine vision, radar positioning, satellite positioning and intelligent control. How to ensure and continuously improve the safety of autonomous driving has always been one of key issues in the field of autonomous driving.

SUMMARY

The present disclosure provides a method for processing behavior data, a method for controlling an autonomous vehicle, apparatuses thereof, a device, a storage medium, a computer program product, and an autonomous vehicle, which improve the safety of autonomous driving.

Some embodiments of the present disclosure provide a method for processing behavior data, including: acquiring historical driving data, the historical driving data comprising lane-level navigation data; and performing data mining on the historical driving data to obtain driving feature information, the driving feature information comprising at least one of: a lane-change position feature, a traveling speed feature, or a traveling path feature.

Some embodiments of the present disclosure provide a method for controlling an autonomous vehicle, including: acquiring driving feature information, wherein the driving feature information is obtained by the method according to the above method for processing behavior data; acquiring perceptual positioning information at a vehicle end; controlling the autonomous vehicle, based on the driving decision-making information.

Some embodiments of the present disclosure provide an apparatus for processing behavior data, including: an acquisition module, configured to acquire historical driving data, the historical driving data comprising lane-level navigation data; and a mining module, configured to perform data mining on the historical driving data to obtain driving feature information, the driving feature information comprising at least one of: a lane-change position feature, a traveling speed feature, or a traveling path feature.

Some embodiments of the present disclosure provide an apparatus for controlling an autonomous vehicle, including: a first acquisition module, configured to acquire driving feature information, wherein the driving feature information is obtained by the apparatus for processing behavior data; a second acquisition module, configured to acquire perceptual positioning information at a vehicle end; a decision-making module, configured to generate driving decision-making information based on the driving feature information and the perceptual positioning information; and a controlling module, configured to control the autonomous vehicle, based on the driving decision-making information.

Some embodiments of the present disclosure provide an electronic device, including: at least one processor; and a memory communicatively connected to the at least one processor; where the memory stores instructions executable by the at least one processor, and the instructions are executed by the at least one processor, such that the at least one processor can execute the above method for processing behavior data or the method for controlling an autonomous vehicle.

Some embodiments of the present disclosure provide a computer readable storage medium storing computer instructions, where the computer instructions are used for causing a computer to execute the above method for processing behavior data or the method for controlling an autonomous vehicle.

Some embodiments of the present disclosure provide a computer program product, including a computer program, where the computer program, when executed by a processor, implements the above method for processing behavior data or the method for controlling an autonomous vehicle.

Some embodiments of the present disclosure provide an autonomous vehicle, including at least one processor; and a memory communicatively connected to the at least one processor; where the memory stores instructions executable by the at least one processor, and the instructions are executed by the at least one processor, such that the at least one processor can execute the above method for processing behavior data or the method for controlling an autonomous vehicle.

It should be understood that contents described in the SUMMARY are neither intended to identify key or important features of embodiments of the present disclosure, nor intended to limit the scope of the present disclosure. Other features of the present disclosure will become readily understood with reference to the following description.

BRIEF DESCRIPTION OF THE DRAWINGS

The accompanying drawings are used for better understanding of the present solution, and do not constitute a limitation to the present disclosure. In which.

DETAILED DESCRIPTION OF EMBODIMENTS

Exemplary embodiments of the present disclosure are described below with reference to the accompanying drawings, where various details of the embodiments of the present disclosure are included to facilitate understanding, and should be considered merely as exemplary. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

Figure 1:
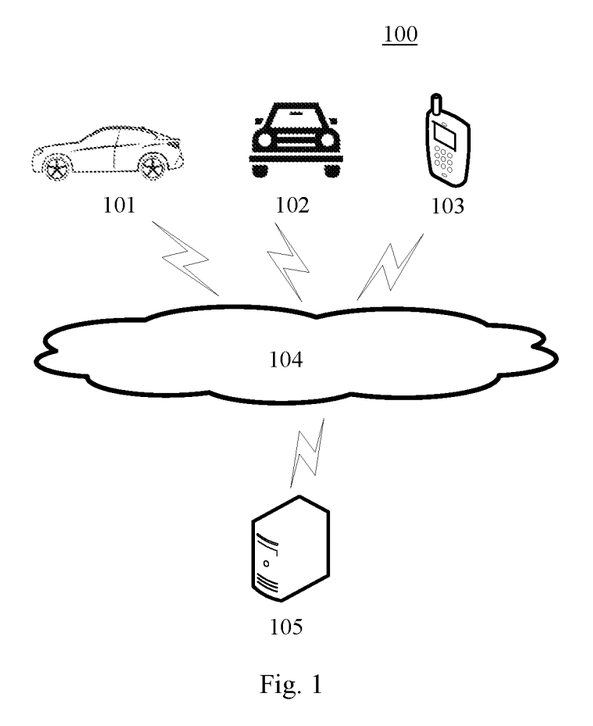
FIG. 1 is an exemplary system architecture diagram to which the present disclosure may be applied.

FIG. 1 shows an exemplary system architecture 100 to which embodiments of a method for processing behavior data or a method for controlling an autonomous vehicle of the present disclosure may be applied.

As shown in FIG. 1, the system architecture 100 may include an autonomous vehicle 101, a general vehicle 102, a terminal device 103, a network 104 and a server 105. The network 104 serves as a medium for providing a communication link between the autonomous vehicle 101, the general vehicle 102, the terminal device 103 and the server 105. The network 103 may include various types of connections, such as wired or wireless communication links, or optical cables.

The autonomous vehicle 101, the general vehicle 102, and the terminal device 103 may interact with the server 105 through the network 104. Various intelligent vehicle-end applications, such as intelligent driving, intelligent navigation applications, may be installed on the autonomous vehicle 101; a driving assistance system, a navigation application module, etc. may be installed on the general vehicle; a navigation application, a map application, etc. may be installed on the terminal device 103. The server 105 may provide various behavior data processing services. For example, the server 105 may acquire driving path information during driving or navigation from the autonomous driving vehicle 101, the general vehicle 102 and the terminal device 103, and acquire captured image data from in-vehicle cameras of the autonomous vehicle 101 and the general vehicle 102, then mine these data to obtain driving feature information, and send the driving feature information to the autonomous vehicle 101. The autonomous vehicle 101 may generate driving decision-making information based on the received driving feature information, and perform autonomous driving behaviors based on the decision-making information.

It should be noted that the terminal device 103 may be hardware or software. When the terminal device 103 is hardware, it may be various electronic devices, including but not limited to smart phones, tablet computers, laptop computers, desktop computers, or the like. When the terminal device 103 is software, it may be installed in the above electronic devices. The terminal device 103 may be implemented as a plurality of software or software modules, or may be implemented as a single software or software module, which is no limited herein. The server 105 may be hardware or software. When the server 105 is hardware, it may be implemented as a distributed server cluster composed of a plurality of servers, or may be implemented as a single server. When the server 105 is software, it may be implemented as a plurality of software or software modules (for example, for providing distributed services), or may be implemented as a single software or software module, which is not limited herein.

It should be understood that the numbers of autonomous vehicles, general vehicles, terminal devices, networks, and servers in FIG. 1 are merely illustrative. Any number of autonomous vehicles, general vehicles, terminal devices, networks, and servers may be provided according to implementation needs.

It should also be noted that the method for processing behavior data provided by embodiments of the present disclosure is generally performed by the server 105, and accordingly, an apparatus for processing behavior data is generally provided in the server 105. In addition, in the embodiments of the present disclosure, behavior data to be processed by the method for processing behavior data may be behavior data generated by vehicles during past driving, that is, historical driving data.

Figure 2:
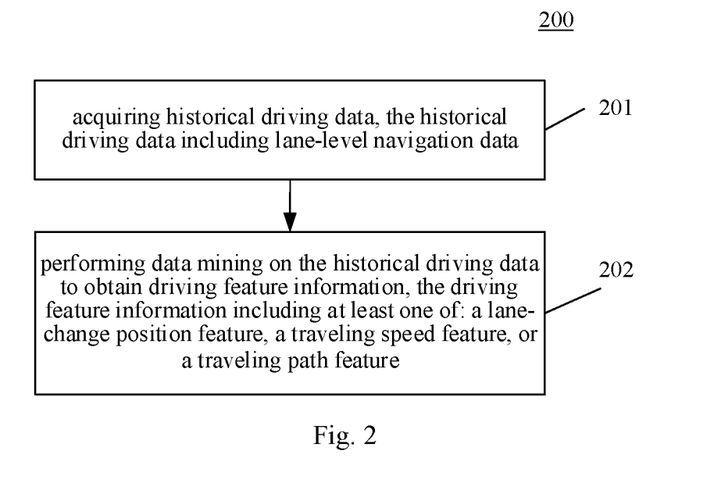
FIG. 2 is a flowchart of an embodiment of a method for processing behavior data according to the present disclosure.

With further reference to FIG. 2, illustrating a flow 200 of an embodiment of a method for processing behavior data according to the present disclosure. The method includes the following step 201 to step 202.

Step 201, acquiring historical driving data, the historical driving data including lane-level navigation data.

In the present embodiment, an executing body of the method for processing behavior data (for example, the server 105 shown in FIG. 1) may first acquire the historical driving data. Here, the historical driving data refers to driving data generated by various types of vehicles during past driving. This data mainly includes the lane-level navigation data, and may also include high-accuracy map data. In addition to content of general maps, high-accuracy maps also store a lot of driving assistance information as structured data, which may include road data, such as lane information, e.g., a position, a type, a width, a slope and a curvature of a lane line, and may also include information about fixed objects around lanes, for example, information such as traffic signs, or traffic lights, road details such as lane height limits, sewer outlets, or obstacles, and infrastructure information such as overhead objects, guardrails, trees, road edge types, or roadside landmarks. The lane-level navigation data includes navigation trajectory information generated based on the high-accuracy maps.

In the present embodiment, the historical driving data are not limited to be derived from the autonomous vehicles, but may also be derived from the general vehicles or navigation applications in terminal devices. For example, after completing each navigation event or driving event, the autonomous vehicle may send generated navigation data to the server as the historical driving data. After completing each navigation task, a navigation module or navigation application integrated in the general vehicle, as well as a navigation application in the terminal device may also send generated navigation data to the server as the historical driving data.

Step 202, performing data mining on the historical driving data to obtain driving feature information, the driving feature information including at least one of: a lane-change position feature, a traveling speed feature, or a traveling path feature.

In the present embodiment, after obtaining the historical driving data, the executing body of the method for processing behavior data needs to perform further data mining on the historical driving data to obtain the required driving feature information. Specifically, due to a relatively large volume of the acquired historical driving data, big data analysis and mining methods, such as classification, regression analysis, clustering, association rules, feature analysis, or variation and deviation analysis, may be used to perform mining on the historical driving data from different perspectives, to obtain one or more of the lane-change position feature, the travelling speed feature, and the traveling path feature, as a component of the driving feature information. The lane-change position feature may be used to represent a lane-change position selected by a vehicle when changing a lane, the traveling speed feature may be used to represent a speed of a vehicle during driving, and the traveling path feature may be used to represent optional paths between two geographic positions.

In some alternative implementations of the present embodiment, the historical driving data further includes in-vehicle image data; and the driving feature information includes at least one of: a dangerous scenario feature, a dynamic event feature, and a road-surface condition feature.

Specifically, the in-vehicle image data may be image data captured, while the vehicle is traveling, by an in-vehicle camera installed on the autonomous vehicle or the general vehicle. By performing mining on the historical driving data including the in-vehicle image data, one or more of the dangerous scenario feature, the dynamic event feature, and the road-surface condition feature may be further obtained, each also used as a component of the driving feature information. The dangerous scenario feature may be used to represent a scenario in which, for example, accidents are more likely to occur during driving, such as a winding mountain-road scenario. The dynamic event feature may be used to represent a temporary event that affects a driving process, such as a traffic accident. The road-surface condition feature may be used to represent road-surface information such as traffic road-surface materials that affect perception of the autonomous vehicles, such as a wet and slippery road surface. By performing mining on the in-vehicle image data, comprehensiveness of the driving feature information may be further improved.

In the method for processing behavior data provided by the above embodiment of the present disclosure, first the historical driving data is acquired, the historical driving data including the lane-level navigation data, and then data mining is performed on the historical driving data to obtain the driving feature information, the driving feature information including at least one of: the lane-change position feature, the traveling speed feature, and the traveling path feature. By fully performing mining on the historical driving data, accurate and comprehensive driving feature information may be obtained.

Figure 3:
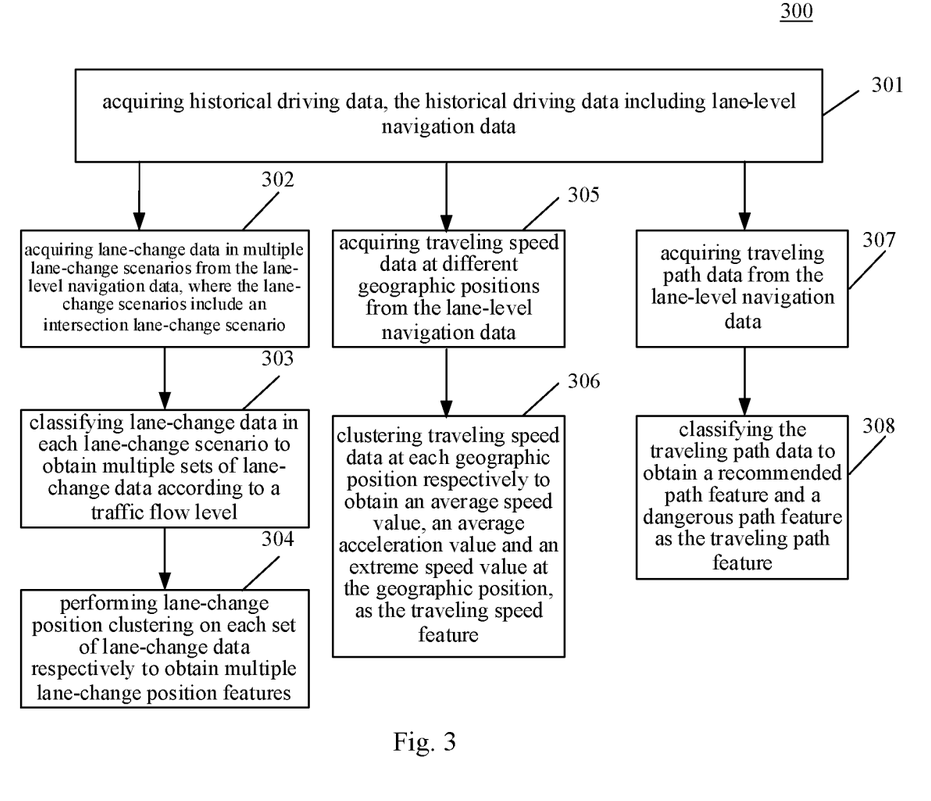
FIG. 3 is a flowchart of another embodiment of the method for processing behavior data according to the present disclosure.

With further reference to FIG. 3, illustrating a flow 300 of another embodiment of the method for processing behavior data according to the present disclosure. The method includes the following step 301 to step 308.

Step 301, acquiring historical driving data, the historical driving data including lane-level navigation data.

In the present embodiment, the specific operation of step 301 has been described in detail in step 201 in the embodiment shown in FIG. 2, and detailed description thereof will be omitted.

In the present embodiment, the obtained driving feature information may include one or more of: the lane-change position feature, the travelling speed feature, and the traveling path feature. If the following steps 302-304 are performed, the obtained driving feature information may include the lane-change position feature. If the following steps 305-306 are performed, the obtained driving feature information may include the traveling speed feature. If the following steps 307-308 are performed, the obtained driving feature information may include the traveling path feature. The method for processing behavior data in the present embodiment may include all of steps 302-308, or may include one or more of steps 302-304, steps 305-306, and steps 307-308.

Step 302, acquiring lane-change data in multiple lane-change scenarios from the lane-level navigation data, where the lane-change scenarios include an intersection lane-change scenario.

In the present embodiment, after obtaining the lane-level navigation data, the executing body of the method for processing behavior data may first screen out the lane-change data in the multiple lane-change scenarios from the navigation data. The lane-change scenarios may include the intersection lane-change scenario or a through lane-change scenario. Intersections may include crossroads, T-junctions, entrances and exits, U-turn intersections, etc., so as to cover lane-change situations of vehicles in scenarios such as intersections, entrances and exits, or expressway ramps. The through lane-change scenario includes a situation where a vehicle changes a lane in a through lane. The lane-change data may include driving trajectory information of the vehicle within a predetermined time period or a predetermined distance before and after changing the lane.

Step 303, classifying lane-change data in each lane-change scenario to obtain multiple sets of lane-change data according to a traffic flow level.

In the present embodiment, after obtaining the lane-change data in the multiple lane-change scenarios, the executing body of the method for processing behavior data may process the lane-change data in each lane-change scenario respectively. Specifically, the lane-change data in a lane change scenario may be classified according to the traffic flow level. The traffic flow level may include three levels of a high flow, a medium flow and a low flow. Specifically, a PV value of a daily average traffic volume of the road where a vehicle is located may be used as a classifying basis. For example, lane-change data generated on a road with a PV value greater than 200 may be classified into a high flow set, lane change data generated on a road with a PV value less than 40 may be classified into a low flow set, and the remaining lane-change data may be classified into a medium flow set. In this way, the multiple sets of lane-change data corresponding to multiple flow levels may be obtained.

Step 304, performing lane-change position clustering on each set of lane-change data respectively to obtain multiple lane-change position features.

In the present embodiment, each lane-change position feature corresponds to a traffic flow level in a lane-change scenario. Specifically, after obtaining the multiple sets of lane-change data, the executing body of the method for processing behavior data may perform clustering operation on each set of data respectively, and may use a commonly used clustering algorithm (such as K-means or hierarchical clustering algorithm) to perform the clustering operation, and then use a clustering result as the lane-change position feature, so as to obtain the multiple lane-change position features. Since each set of lane-change data corresponds to a traffic flow level in a lane-change scenario, the obtained lane-change position features may also be distinguished according to the lane-change scenario and the traffic flow level.

By classifying the lane-level navigation data according to the lane-change scenario and the traffic flow level, the finally obtained lane-change position features are more targeted and suitable for a variety of lane-change situations.

Step 305, acquiring traveling speed data at different geographic positions from the lane-level navigation data.

In the present embodiment, after obtaining the lane-level navigation data, the executing body of the method for processing behavior data may acquire traveling speed data of each vehicle at the geographic positions based on the driving trajectories and traveling speeds of the vehicles in the lane-level navigation data, so that multiple traveling speed data may be obtained at one geographical position. The geographic position may be a specific coordinate point in a high-accuracy map.

Step 306, clustering traveling speed data at each geographic position respectively to obtain an average speed value, an average acceleration value and an extreme speed value at the geographic position, as the traveling speed feature.

In the present embodiment, the executing body of the method for processing behavior data may use a clustering algorithm to cluster the traveling speed data at each geographic position respectively. In particular, a density clustering algorithm in machine learning, such as DBSCAN (Density-Based Spatial Clustering of Applications with Noise), may be used for clustering. The obtained clustering result may include the average speed value, the average acceleration value and the extreme speed value at each geographic position. The average speed value may be an average speed of multiple vehicles traveling at the geographic position, the average acceleration value may be an average acceleration used when multiple vehicles accelerate or decelerate at the geographic position, and the extreme speed value may be the maximum and minimum speeds of multiple vehicles traveling at the geographic position. The average speed value, the average acceleration value and the extreme speed value at each geographic position may be used collectively as the traveling speed feature.

By clustering the traveling speed data at the different geographic positions respectively, the obtained traveling speed feature may accurately correspond to coordinates of the geographic positions, which improves reliability of the traveling speed feature.

Step 307, acquiring traveling path data from the lane-level navigation data.

In the present embodiment, the executing body of the method for processing behavior data may determine a vehicle a traveling trajectory for each navigation process from the lane-level navigation data, and determine a path traveled by the vehicle from a starting position to an end position of this navigation according to the traveling trajectory. The traveling path between the two geographic positions obtained in this way may be used as the acquired traveling path data. It may be understood that the traveling path may be affected by factors such as road traffic conditions during navigation, or preferences of a navigation user. Therefore, the traveling path between two specific geographic positions may include various road combinations.

Step 308, classifying the traveling path data to obtain a recommended path feature and a dangerous path feature as the traveling path feature.

In the present embodiment, after acquiring the traveling path data, the executing body of the method for processing behavior data may use a statistical analysis method in statistics to classify the traveling path data, or input the traveling path data into a pre-trained classification model for classification. After classifying the traveling path data, the recommended path feature and the dangerous path feature may be obtained. The recommended path feature may be used to represent a road combination that is travelled more frequently between two geographic positions, and is often used as a planning path for driving decision-making; the dangerous path feature may be used to represent a road combination that is travelled less frequently between two geographic positions, and where dangerous driving behaviors (for example, travelling on the wrong side of the road, illegal lane change, etc.) often occur. After the classification, for those traveling path features that cannot be classified into the recommended path feature or the dangerous path feature, other path features may also be formed, which may also be used as part of the traveling path feature.

By classifying the traveling path data, the obtained traveling path feature may include the recommended path feature and the dangerous path feature, which improves reliability and safety of the traveling path feature.

Figure 4:
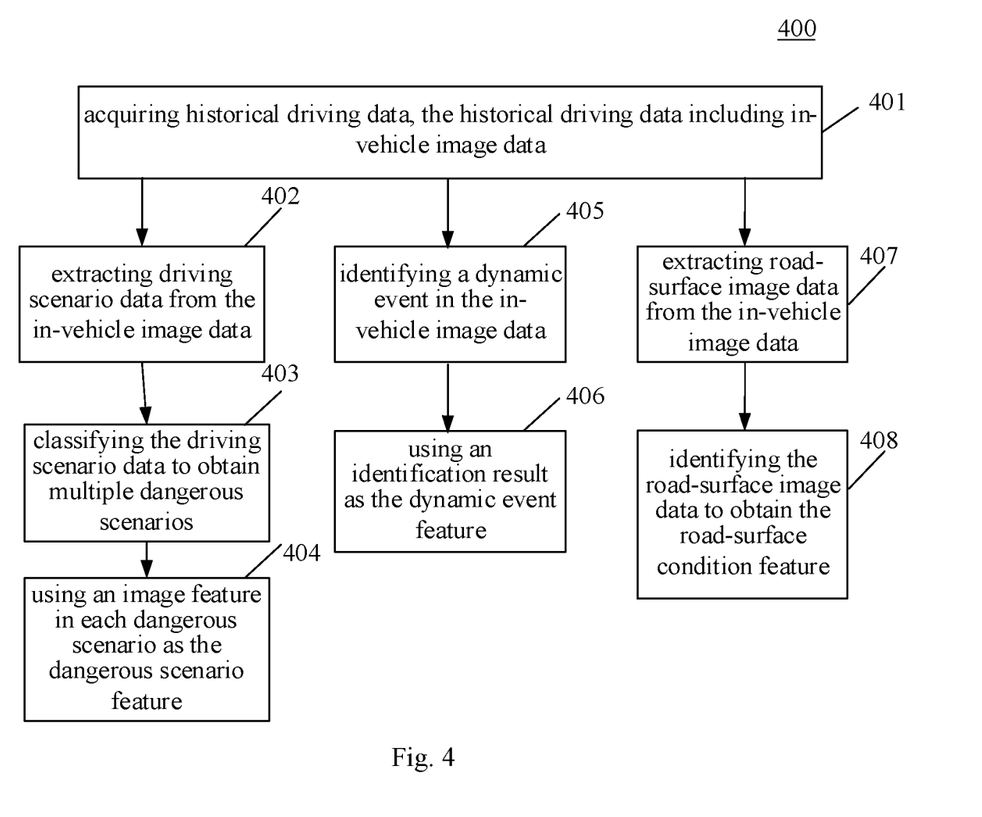
FIG. 4 is a flowchart of yet another embodiment of the method for processing behavior data according to the present disclosure.

With further reference to FIG. 4, illustrating a flow 400 of yet another embodiment of the method for processing behavior data according to the present disclosure. The method includes the following step 401 to step 408.

Step 401, acquiring historical driving data, the historical driving data including in-vehicle image data.

In the present embodiment, the specific operation of step 401 has been described in detail in step 201 in the embodiment shown in FIG. 2, and detailed description thereof will be omitted.

In the present embodiment, the historical driving data may include the in-vehicle image data, and may also include both the lane-level navigation data and the high-accuracy maps.

In the present embodiment, the obtained driving feature information may include one or more of: a dangerous scenario feature, a dynamic event feature, and a road-surface condition feature. If the following steps 402-404 are performed, the obtained driving feature information may include the dangerous scenario feature. If the following steps 405-406 are performed, the obtained driving feature information may include the dynamic event feature. If the following steps 407-408 are performed, the obtained driving feature information may include the road-surface condition feature. The method for processing behavior data in the present embodiment may include all of steps 402-408, or may include one or more of steps 402-404, steps 405-406, and steps 407-408. It should be noted that steps 402-408 in the present embodiment do not conflict with steps 302-308 in FIG. 3, and they may exist at the same time. In some alternative implementations of the present embodiment, the method for processing behavior data may include one or more of steps 302-304, steps 305-306, steps 307-308, steps 402-404, steps 405-406 and steps 407-408.

Step 402, extracting driving scenario data from the in-vehicle image data.

In the present embodiment, the executing body of the method for processing behavior data may first convert video data in the in-vehicle image data into image data. For example, image frames representative of scenarios in the video data may be retained, and the remaining frames may be deleted. Similar filtering may also be performed on the image data in the in-vehicle image, and the finally obtained driving scenario data includes multiple images with driving scenarios as the main display content.

Step 403, classifying the driving scenario data to obtain multiple dangerous scenarios.

In the present embodiment, the executing body of the method for processing behavior data may use an image classification method to classify the multiple images included in the driving scenario data to obtain the multiple dangerous scenarios. A dangerous scenario refers to a scenario in which incidents such as accidents are relatively prone to occur during driving, and may specifically include a curve scenario, and a laneway scenario. The curve scenario may include a curve scenario in a city road, also may include a curve scenario in a mountain road or in the highway. The laneway scenario mainly corresponds to a scenario where the road is extremely narrow and there are many obstacles on both sides. It may be understood that the above examples of specific dangerous scenarios do not constitute a limitation on the present embodiment. Scenarios that may affect driving safety, such as potholes and unpaved roads, may all be used as dangerous scenarios in the present embodiment.

Step 404, using an image feature in each dangerous scenario as the dangerous scenario feature.

In the present embodiment, the image classification method in the above step 403 is based on image features for classification, so, after the classification, the image feature corresponding to each dangerous scenario may be obtained, and these image features may be used as the dangerous scenario feature.

In some alternative implementations of the present embodiment, the executing body of the method for processing behavior data may directly input the obtained in-vehicle image data into an image classification model based on deep learning. Since the model mainly focuses on the image features related to the dangerous scenarios during previous training, it may directly used to classify the in-vehicle image data and output the dangerous scenario feature.

By classifying and identifying the driving scenario data in the in-vehicle image data, accurate dangerous scenario feature may be obtained, which improves the comprehensiveness of the driving feature information.

Step 405, identifying a dynamic event in the in-vehicle image data.

In the present embodiment, the dynamic event includes at least one of: a construction event, or an accident event. Specifically, the dynamic event may refer to a non-fixed event that affects vehicle traveling, such as some temporary events that occur on the road, including construction events, accident events, traffic control events, or the like. When identifying the dynamic event, the executing body of the method for processing behavior data in the present embodiment may identify information such as accidents, construction signs in images through a deep learning algorithm to obtain the dynamic event by mining. Specifically, the in-vehicle image data may be input into a deep learning convolutional neural network algorithm model for dynamic event identification.

Step 406, using an identification result as the dynamic event feature.

In the present embodiment, since the model used in step 405 mainly focuses on image features related to the dynamic event during previous training, the output identification result may be directly used as the dynamic event feature.

By identifying the dynamic event in the in-vehicle image data, the obtained dynamic event feature may be used as part of the driving feature information, which further improves the comprehensiveness of the driving feature information.

Step 407, extracting road-surface image data from the in-vehicle image data.

In the present embodiment, the executing body of the method for processing behavior data may first extract the road-surface image data related to road-surface conditions from the in-vehicle image data. For example, an image in which road surface is located may be intercepted from videos or images captured by an in-vehicle camera, as the road-surface image data.

Step 408, identifying the road-surface image data to obtain the road-surface condition feature.

In the present embodiment, the road-surface condition feature includes at least one of: a wear feature of a road surface, a slippery feature of a road surface, a pothole feature of a road surface, or an obstacle feature of a road surface. The executing body of the method for processing behavior data may use a deep learning algorithm to process the road-surface image data to obtain the road-surface condition feature.

In some alternative implementations of the present embodiment, the executing body of the method for processing behavior data may directly input the obtained in-vehicle image data into an image classification model based on deep learning. Since the model mainly focuses on image features related to road-surface conditions during previous training, it may directly identify the in-vehicle image data and output the road-surface condition feature.

By identifying the road-surface conditions in the in-vehicle image data, the obtained road-surface condition feature may be used as part of the driving feature information, which further improves the comprehensiveness of the driving feature information.

Figure 5:
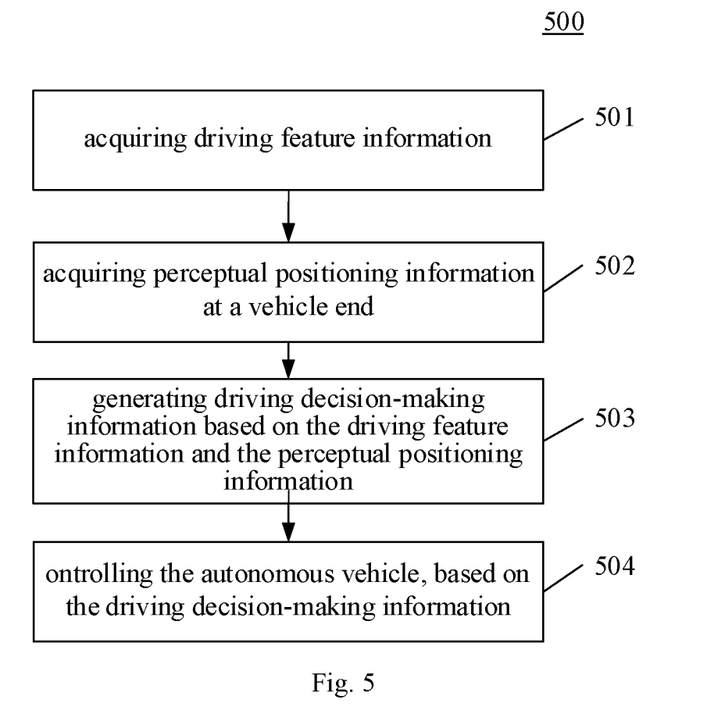
FIG. 5 is a flowchart of an embodiment of a method for controlling an autonomous vehicle according to the present disclosure.

With further reference to FIG. 5, illustrating a flow 500 of an embodiment of a method for controlling an autonomous vehicle according to the present disclosure, and the method for controlling includes the following step 501 to step 504.

Step 501, acquiring driving feature information.

In the present embodiment, an executing body of the method for controlling an autonomous vehicle (for example, the autonomous vehicle 101 shown in FIG. 1) may acquire the driving feature information from a server. The driving feature information may be obtained by the server according to the method for processing behavior data of any one of the embodiments in FIG. 2 to FIG. 4. The driving feature information may include one or more of the lane-change position feature, the traveling speed feature, the traveling path feature, the dangerous scenario feature, the dynamic event feature, and the road-surface condition feature.

Step 502, acquiring perceptual positioning information at a vehicle end.

In the present embodiment, the executing body of the method for controlling an autonomous vehicle may also acquire the perceptual information at the vehicle end through a sensor provided at the vehicle end. The sensor at the vehicle end may be a point cloud sensor or an image sensor. The point cloud sensor is a sensor that may collect point cloud data, and is generally a 3D (3-dimension) sensor.

The point cloud sensor includes a light detection and ranging (Lidar) sensor and a radio detection and ranging (Radar) sensor. The image sensor is a sensor that may collect images, and is generally a 2D (2-dimension) sensor, such as a camera sensor. After obtaining the images and the point cloud data, the perceptual positioning information may be acquired through a perceptual positioning algorithm model. The perceptual positioning information may include static traffic elements such as road-surface markings or obstacles, and dynamic elements such as vehicles or pedestrians.

Step 503, generating driving decision-making information based on the driving feature information and the perceptual positioning information.

In the present embodiment, the executing body of the method for controlling an autonomous vehicle may perform a multi-modal information fusion operation on the driving feature information and the perceptual positioning information, and generate the driving decision-making information based on fused information. The driving decision-making information may be used to instruct the autonomous vehicle to generate a vehicle driving task, perform travelling path planning, or perform exception handling, or the like.

In some alternative implementations, based on pre-established driving decision-making rules, the driving feature information and the perceptual positioning information may be fused to generate the driving decision-making information. In some other alternative implementations, the driving feature information and the perceptual positioning information may also be input into a deep learning multimodal information fusion model, and the driving decision-making information may be inferred through the model.

Step 504, controlling the autonomous vehicle, based on the driving decision-making information.

In the present embodiment, the executing body of the method for controlling an autonomous vehicle may control the autonomous vehicle to perform an autonomous driving task, perform path planning, and handle an exceptional event, or the like, based on the generated driving decision-making information.

In some alternative implementations of the present embodiment, the method 600 for controlling an autonomous vehicle further includes: acquiring V2X information for vehicle-use wireless communication; and the generating driving decision-making information based on the driving feature information and the perceptual positioning information, includes: generating the driving decision-making information based on the driving feature information, the perceptual positioning information and the V2X information.

In the present embodiment, the executing body of the method for controlling an autonomous vehicle may also acquire the V2X information. V2X (vehicle to X or Vehicle to Everything) refers to vehicle-use wireless communication technology, also called vehicle-to-everything communication, which enables vehicles to obtain a series of traffic information such as real-time road conditions, road information, and pedestrian information, improving driving safety, reducing congestion, improving a traffic efficiency, etc. Here, V represents the vehicle, and X represents any object that interacts with the vehicle. Currently, X mainly includes a vehicle (Vehicle to Vehicle, V2V), a person (Vehicle to Pedestrian, V2P), a traffic roadside infrastructure (Vehicle to Infrastructure, V2I) and a Network (Vehicle to Network, V2N). The V2X information may include surrounding environment information such as surrounding infrastructures, other vehicles, or pedestrians.

When generating the driving decision-making information, multi-modal information fusion operation may be performed on the driving feature information, the perceptual positioning information and the V2X information to generate the driving decision-making information, and the driving decision-making information is generated based on the fused information. For the method for generating, reference may be made to the above step 603, and detailed description thereof will be omitted.

As can be seen from FIG. 5, the method for controlling an autonomous vehicle in the present embodiment first acquires the driving feature information and the perceptual positioning information at the vehicle end, then generates the driving decision-making information based on the driving feature information and the perceptual positioning information, and finally controls the autonomous vehicle based on the driving decision-making information. By generating the driving decision-making information based on the driving feature information, the driving decision-making information may be obtained on the basis of referring to big data of driving history, which improves the safety of autonomous driving.

Figure 6:
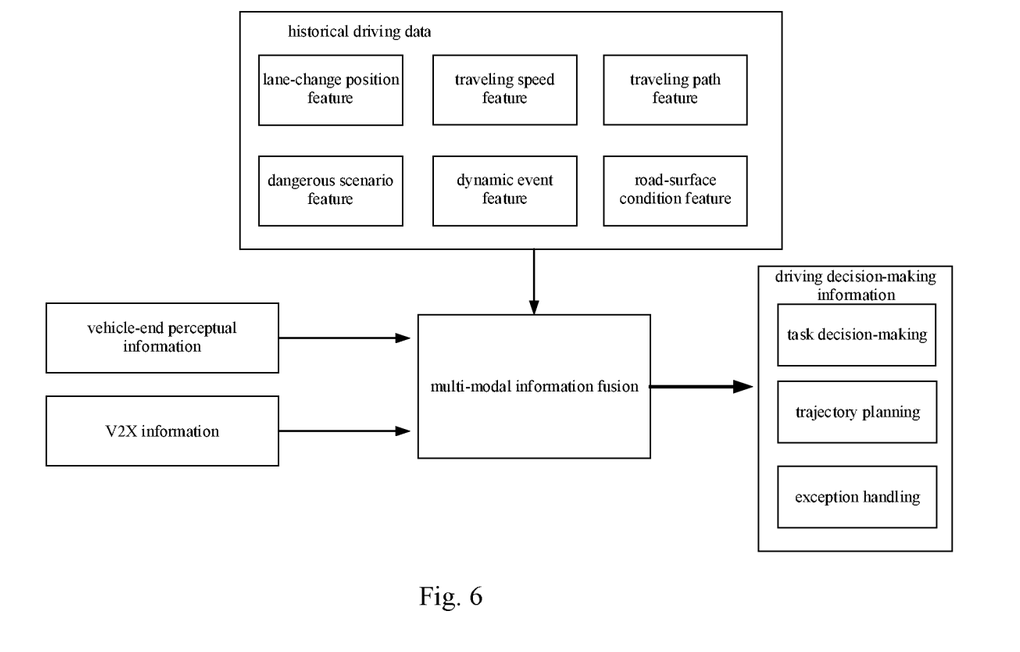
FIG. 6 is a schematic diagram of a process of generating driving decision-making information according to the present disclosure.

For ease of understanding, FIG. 6 shows a schematic diagram of a process of generating driving decision-making information in an embodiment of the present disclosure. As shown in FIG. 6, a server obtains driving features by mining historical driving data, which may specifically include a lane-change position feature, a traveling speed feature, a traveling path feature, a dangerous scenario feature, a dynamic event feature and a road-surface condition feature. An autonomous vehicle may acquire all the driving features mined from the server, and acquire vehicle-end perceptual information through a vehicle-end sensor, may also acquire V2X information through roadside equipment, and then perform multi-modal information fusion on the driving features, the vehicle-end perceptual information, and the V2X information to obtain driving decision-making information including task decision-making, trajectory planning, and exception handling.

Figure 7:
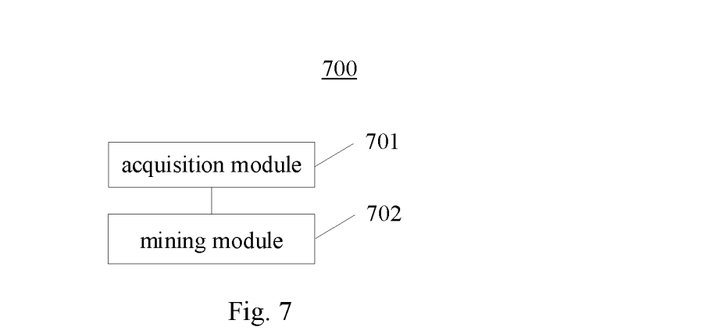
FIG. 7 is a schematic structural diagram of an embodiment of an apparatus for processing behavior data according to the present disclosure.

With further reference to FIG. 7, as an implementation of the method shown in FIG. 2-FIG. 4, the present disclosure provides an embodiment of an apparatus for processing behavior data, and the apparatus embodiment corresponds to the method embodiments as shown in FIG. 2-FIG. 4. The apparatus may be applied to various servers.

As shown in FIG. 7, the apparatus 700 for processing behavior data in the present embodiment may include an acquisition module 701 and a mining module 702. The acquisition module 701 is configured to acquire historical driving data, the historical driving data including lane-level navigation data. The mining module 702 is configured to perform data mining on the historical driving data to obtain driving feature information, the driving feature information including at least one of: a lane-change position feature, a traveling speed feature, or a traveling path feature.

In the present embodiment, in the apparatus 700 for processing behavior data: for the specific processing and the technical effects of the acquisition module 701 and the mining module 702, reference may be made to the relevant descriptions of steps 201-202 in the corresponding embodiment of FIG. 2, and detailed description thereof will be omitted.

In some alternative implementations of the present embodiment, the historical driving data further includes in-vehicle image data; and the driving feature information includes at least one of: a dangerous scenario feature, a dynamic event feature, and a road-surface condition feature.

In some alternative implementations of the present embodiment, the driving feature information includes the lane-change position feature, and the mining module 702 includes: a first acquisition unit, configured to acquire lane-change data in multiple lane-change scenarios from the lane-level navigation data, where the lane-change scenarios include an intersection lane-change scenario; a flow classification unit, configured to perform classifying, for lane-change data in each lane-change scenario, to obtain multiple sets of lane-change data according to a traffic flow level; and a position clustering unit, configured to perform lane-change position clustering on each set of lane-change data respectively to obtain multiple lane-change position features, where each lane-change position feature corresponds to a class of traffic flow level in a lane-change scenario.

In some alternative implementations of the present embodiment, the driving feature information includes the traveling speed feature, and the mining module 702 includes: a second acquisition unit, configured to acquire traveling speed data at different geographic positions from the lane-level navigation data; and a speed clustering unit, configured to cluster traveling speed data at each geographic position respectively to obtain an average speed value, an average acceleration value and an extremum speed value at the different geographic positions, as the traveling speed feature.

In some alternative implementations of the present embodiment, the driving feature information includes the traveling path feature, and the mining module 702 includes: a third acquisition unit, configured to acquire traveling path data from the lane-level navigation data; and a path classifying unit, configured to classify the traveling path data to obtain a recommended path feature and a dangerous path feature as the traveling path feature.

In some alternative implementations of the present embodiment, the driving feature information includes the dangerous scenario feature, and the mining module 702 includes: a fourth acquisition unit, configured to extract driving scenario data from the in-vehicle image data; a scenario classifying unit, configured to classify the driving scenario data to obtain multiple dangerous scenarios, where the multiple dangerous scenarios include a curve-road scenario, a laneway scenario; and a feature determining unit, configured to use image features in each dangerous scenario as the dangerous scenario feature.

In some alternative implementations of the present embodiment, the driving feature information includes the dynamic event feature, and the mining module 702 includes: an event identifying unit, configured to identify a dynamic event in the in-vehicle image data, where the dynamic event includes at least one of: a construction event, or an accident event; and an event determining unit, configured to use an identification result as the dynamic event feature.

In some alternative implementations of the present embodiment, the driving feature information includes the road-surface condition feature, and the mining module 702 includes: a fifth acquisition unit, configured to extract road-surface image data from the in-vehicle image data; and a road surface identifying unit, configured to identify the road-surface image data to obtain the road-surface condition feature, where the road-surface condition feature includes at least one of: a wear feature of a road surface, a slippery feature of a road surface, a pothole feature of a road surface, or an obstacle feature of a road surface.

Figure 8:
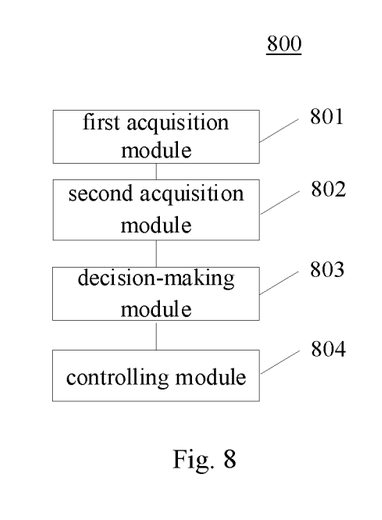
FIG. 8 is a schematic structural diagram of an embodiment of an apparatus for controlling an autonomous vehicle according to the present disclosure.

With further reference to FIG. 8, as an implementation of the method shown in FIG. 5, the present disclosure provides an embodiment of an apparatus for controlling an autonomous vehicle, and the apparatus embodiment corresponds to the method embodiment as shown in FIG. 5. The apparatus may be applied to autonomous vehicles.

As shown in FIG. 8, the apparatus 800 for controlling an autonomous vehicle in the present embodiment may include a first acquisition module 801, a second acquisition module 802, a decision-making module 803 and a controlling module 804. The first acquisition module 801 is configured to acquire driving feature information, where the driving feature information is obtained by the apparatus for processing behavior data shown in FIG. 7. The second acquisition module 802 is configured to acquire perceptual positioning information at a vehicle end. The decision-making module 803 is configured to generate driving decision-making information based on the driving feature information and the perceptual positioning information. The controlling module 804 is configured to control the autonomous vehicle, based on the driving decision-making information.

In the present embodiment, in the apparatus 800 for controlling an autonomous vehicle: for the specific processing and the technical effects of the first acquisition module 801, the second acquisition module 802, the decision-making module 803 and the controlling module 804, reference may be made to the relevant descriptions of steps 501-502 in the corresponding embodiment of FIG. 5, and detailed description thereof will be omitted.

The apparatus 800 for controlling further includes: a third acquisition module, configured to acquire V2X information for vehicle wireless communication; and the decision-making module 803 includes: a decision-making unit, configured to generate the driving decision-making information based on the driving feature information, the perceptual positioning information and the V2X information.

According to an embodiment of the present disclosure, the present disclosure also provides an electronic device, a readable storage medium, a computer program product and an autonomous vehicle.

Figure 9:
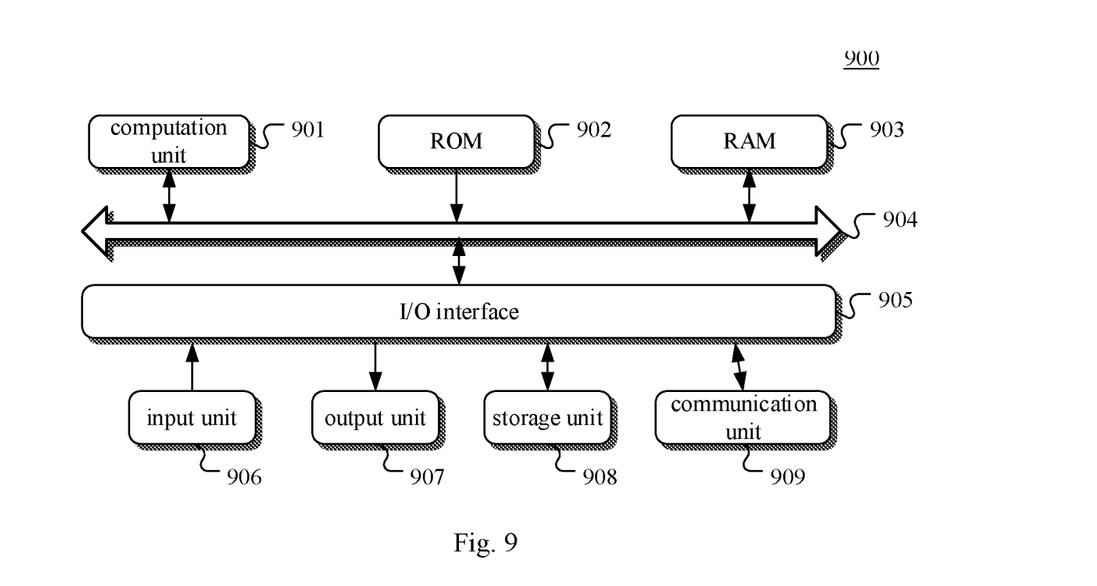
FIG. 9 is a block diagram of an electronic device used to implement the method for processing behavior data or the method for controlling an autonomous vehicle according to embodiments of the present disclosure.

FIG. 9 shows a schematic block diagram of an example electronic device 900 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 9, the device 900 includes a computation unit 901, which may perform various appropriate actions and processing, based on a computer program stored in a read-only memory (ROM) 902 or a computer program loaded from a storage unit 908 into a random access memory (RAN) 903. In the RAM 903, various programs and data required for the operation of the device 900 may also be stored. The computation unit 901, the ROM 902, and the RAM 903 are connected to each other through a bus 904. An input/output (I/O) interface 905 is also connected to the bus 904.

A plurality of parts in the device 900 are connected to the I/O interface 905, including: an input unit 906, for example, a keyboard and a mouse; an output unit 907, for example, various types of displays and speakers; the storage unit 908, for example, a disk and an optical disk; and a communication unit 909, for example, a network card, a modem, or a wireless communication transceiver. The communication unit 909 allows the device 900 to exchange information/data with other devices over a computer network such as the Internet and/or various telecommunication networks.

The computation unit 901 may be various general-purpose and/or dedicated processing components having processing and computing capabilities. Some examples of the computation unit 901 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 901 performs the various methods and processes described above, such as the method for processing behavior data or the method for controlling an autonomous vehicle. For example, in some embodiments, the method for processing behavior data or the method for controlling an autonomous vehicle may be implemented as a computer software program, which is tangibly included in a machine readable medium, such as the storage unit 908. In some embodiments, part or all of the computer program may be loaded and/or installed on the device 900 via the ROM 902 and/or the communication unit 909. When the computer program is loaded into the RAM 903 and executed by the computation unit 901, one or more steps of the method for processing behavior data or the method for controlling an autonomous vehicle described above may be performed. Alternatively, in other embodiments, the computation unit 901 may be configured to perform the method for processing behavior data or the method for controlling an autonomous vehicle by any other appropriate means (for example, by means of firmware).

The autonomous vehicle provided by the present disclosure may include the above electronic device as shown in FIG. 9, and the electronic device may implement the method for controlling an autonomous vehicle described in the above embodiment, when executed by a processor.

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAN), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LANl), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other. The server may be a cloud server, is also known as a cloud computing server or a cloud host, and is a host product in a cloud computing service system to solve the defects of difficult management and weak service extendibility existing in conventional physical hosts and virtual private servers (VPS); or may be a distributed system server, or may be a server combined with a blockchain.

It should be understood that the various forms of processes shown above may be used to reorder, add, or delete steps. For example, the steps disclosed in the present disclosure may be executed in parallel, sequentially, or in different orders, as long as the desired results of the technical solutions provided in the present disclosure can be implemented. This is not limited herein.

In the technical solution of the present disclosure, the acquisition, storage, and application of the user personal information involved are all in compliance with the relevant laws and regulations, and do not violate public order and good customs.

The above specific embodiments do not constitute a limitation on the protection scope of the present disclosure. It should be understood by those skilled in the art that various modifications, combinations, sub-combinations and substitutions may occur depending on design requirements and other factors. Any modifications, equivalent replacements, and improvements made within the spirit and principle of the present disclosure should be included within the protection scope of the present disclosure.

What is claimed is:

1. A method for processing behavior data, the method comprising:
   acquiring historical driving data, the historical driving data comprising lane-level navigation data;
   performing data mining on the historical driving data to obtain driving feature information, the driving feature information comprising a lane-change position feature, and at least one of: a traveling speed feature or a traveling path feature;
   acquiring perceptual positioning information at a vehicle end;
   generating driving decision-making information based on the driving feature information and the perceptual positioning information; and
   controlling the vehicle, based on the driving decision-making information, wherein the performing data mining on the historical driving data to obtain driving feature information, comprises:
   acquiring lane-change data in a plurality of lane-change scenarios from the lane-level navigation data, wherein the lane-change scenarios comprise an intersection lane-change scenario;
   obtaining a first set of lane-change data generated on a first road with a first traffic flow smaller than a flow threshold, and obtaining a second set of lane-change data generated on a second road with a second traffic flow greater than the flow threshold; and
   obtaining a first clustering result corresponding to the first traffic flow smaller than the flow threshold by performing a first clustering operation on the first set of lane-change data, and obtaining a second clustering result corresponding to the second traffic flow greater than the flow threshold by performing a second clustering operation on the second set of lane-change data.

2. The method according to claim 1, wherein the historical driving data further comprises in-vehicle image data; and
   the driving feature information comprises at least one of: a dangerous scenario feature, a dynamic event feature, and a road-surface condition feature.

3. The method according to claim 2, wherein the driving feature information comprises the dangerous scenario feature, and the performing data mining on the historical driving data to obtain driving feature information, comprises:
   extracting driving scenario data from the in-vehicle image data;
   classifying the driving scenario data to obtain a plurality of dangerous scenarios, wherein the plurality of dangerous scenarios comprise a curve-road scenario, a laneway scenario; and
   using image features in each dangerous scenario as the dangerous scenario feature.

4. The method according to claim 2, wherein the driving feature information comprises the dynamic event feature, and the performing data mining on the historical driving data to obtain driving feature information, comprises:
   identifying a dynamic event in the in-vehicle image data, wherein the dynamic event comprises at least one of: a construction event, or an accident event; and
   using an identification result as the dynamic event feature.

5. The method according to claim 2, wherein the driving feature information comprises the road-surface condition feature, and the performing data mining on the historical driving data to obtain driving feature information, comprises:
   extracting road-surface image data from the in-vehicle image data; and
   identifying the road-surface image data to obtain the road-surface condition feature, wherein the road-surface condition feature comprises at least one of: a wear feature of a road surface, a slippery feature of a road surface, a pothole feature of a road surface, or an obstacle feature of a road surface.

6. The method according to claim 1, wherein the driving feature information comprises the traveling path feature, and the performing data mining on the historical driving data to obtain driving feature information, comprises:
   acquiring traveling path data from the lane-level navigation data; and
   classifying the traveling path data to obtain a recommended path feature and a dangerous path feature as the traveling path feature.

7. The method according to claim 1, wherein the method further comprises:
   acquiring V2X information for vehicle wireless communication; and
   the generating driving decision-making information based on the driving feature information and the perceptual positioning information, comprises:
   generating the driving decision-making information based on the driving feature information, the perceptual positioning information and the V2X information.

8. The method according to claim 1, wherein the performing data mining on the historical driving data to obtain driving feature information, comprises:
   acquiring traveling speed data at a given geographic position from the lane-level navigation data; and
   obtaining an average acceleration value of a plurality of vehicles accelerating or decelerating at a given geographic position by clustering the traveling speed data at the given geographic position,
   wherein the traveling speed feature comprises the average acceleration value of the plurality of vehicles at the given geographic position.

9. The method according to claim 1, wherein the performing data mining on the historical driving data to obtain driving feature information, comprises:
   acquiring traveling speed data at a given geographic position from the lane-level navigation data; and
   obtaining a maximum or minimum speed of a plurality of vehicles at a given geographic position by clustering the traveling speed data at the given geographic position, wherein the traveling speed feature comprises the maximum or minimum speed of the plurality of vehicles at the given geographic position.

10. The method according to claim 1, wherein the performing data mining on the historical driving data to obtain driving feature information, comprises:
    acquiring traveling speed data at a given geographic position from the lane-level navigation data; and
    obtaining an average speed of a plurality of vehicles at the given geographic position by clustering the traveling speed data at the given geographic position, wherein the traveling speed feature comprises the average speed of the plurality of vehicles at the given geographic position.

11. An apparatus for processing behavior data, the apparatus comprising:
    at least one processor; and
    a memory storing instructions, wherein the instructions when executed by the at least one processor, cause the at least one processor to perform operations, the operations comprising:
    acquiring historical driving data, the historical driving data comprising lane-level navigation data;
    performing data mining on the historical driving data to obtain driving feature information, the driving feature information comprising a lane-change position feature, and at least one of: a traveling speed feature or a traveling path feature;
    acquiring perceptual positioning information at a vehicle end;
    generating driving decision-making information based on the driving feature information and the perceptual positioning information; and
    controlling the vehicle, based on the driving decision-making information,
    wherein the performing data mining on the historical driving data to obtain driving feature information, comprises:
    acquiring lane-change data in a plurality of lane-change scenarios from the lane-level navigation data, wherein the lane-change scenarios comprise an intersection lane-change scenario;
    obtaining a first set of lane-change data generated on a first road with a first traffic flow smaller than a flow threshold, and obtaining a second set of lane-change data generated on a second road with a second traffic flow greater than the flow threshold; and
    obtaining a first clustering result corresponding to the first traffic flow smaller than the flow threshold by performing a first clustering operation on the first set of lane-change data, and obtaining a second clustering result corresponding to the second traffic flow greater than the flow threshold by performing a second clustering operation on the second set of lane-change data.

12. The apparatus according to claim 11, wherein the historical driving data further comprises in-vehicle image data; and
    the driving feature information comprises at least one of: a dangerous scenario feature, a dynamic event feature, and a road-surface condition feature.

13. The apparatus according to claim 12, wherein the driving feature information comprises the dangerous scenario feature, and the performing data mining on the historical driving data to obtain driving feature information comprises:
    extracting driving scenario data from the in-vehicle image data;
    classifying the driving scenario data to obtain a plurality of dangerous scenarios, wherein the plurality of dangerous scenarios comprise a curve-road scenario, a laneway scenario; and
    using image features in each dangerous scenario as the dangerous scenario feature.

14. The apparatus according to claim 12, wherein the driving feature information comprises the dynamic event feature, and the performing data mining on the historical driving data to obtain driving feature information comprises:
    identifying a dynamic event in the in-vehicle image data, wherein the dynamic event comprises at least one of: a construction event, or an accident event; and
    using an identification result as the dynamic event feature.

15. The apparatus according to claim 12, wherein the driving feature information comprises the road-surface condition feature, and the performing data mining on the historical driving data to obtain driving feature information comprises:
    extracting road-surface image data from the in-vehicle image data; and
    identifying the road-surface image data to obtain the road-surface condition feature, wherein the road-surface condition feature comprises at least one of: a wear feature of a road surface, a slippery feature of a road surface, a pothole feature of a road surface, or an obstacle feature of a road surface.

16. The apparatus according to claim 11, wherein the driving feature information comprises the traveling path feature, and the performing data mining on the historical driving data to obtain driving feature information comprises:
    acquiring traveling path data from the lane-level navigation data; and
    classifying the traveling path data to obtain a recommended path feature and a dangerous path feature as the traveling path feature.

17. The apparatus according to claim 11, wherein the operations further comprise:
    acquiring perceptual positioning information at a vehicle end;
    generating driving decision-making information based on the driving feature information and the perceptual positioning information; and
    controlling the vehicle, based on the driving decision-making information.

18. A non-transitory computer readable storage medium storing computer instructions, wherein, the computer instructions are used to cause the computer to perform operations comprising:
    acquiring historical driving data, the historical driving data comprising lane-level navigation data;
    performing data mining on the historical driving data to obtain driving feature information, the driving feature information comprising a lane-change position feature, and at least one of: a traveling speed feature, or a traveling path feature;
    acquiring perceptual positioning information at a vehicle end;
    generating driving decision-making information based on the driving feature information and the perceptual positioning information; and
    controlling the vehicle, based on the driving decision-making information,
    wherein the performing data mining on the historical driving data to obtain driving feature information, comprises:

acquiring lane-change data in a plurality of lane-change scenarios from the lane-level navigation data, wherein the lane-change scenarios comprise an intersection lane-change scenario;

obtaining a first set of lane-change data generated on a first road with a first traffic flow smaller than a flow threshold, and obtaining a second set of lane-change data generated on a second road with a second traffic flow greater than the flow threshold; and obtaining a first clustering result corresponding to the first traffic flow smaller than the flow threshold by performing a first clustering operation on the first set of lane-change data, and obtaining a second clustering result corresponding to the second traffic flow greater than the flow threshold by performing a second clustering operation on the second set of lane-change data.

* * * * *